United States Patent Office 3,684,639
Patented Aug. 15, 1972

3,684,639
HEAT SEALING TEXTILE SHEETS WITH POLY-URETHANE HEAT SEALING ADHESIVES
Wolfgang Keberle and Hellmut Striegler, Leverkusen, and Karl-Arnold Weber, Cologne-Stammheim, Germany, assignors to Farbenfabriken Bayer Aktiengesellschaft, Leverkusen, Germany
No Drawing. Filed June 9, 1970, Ser. No. 44,863
Claims priority, application Germany, June 14, 1969,
P 19 30 340.3
Int. Cl. B32b 5/16, 27/40; C09j 3/16
U.S. Cl. 161—87           1 Claim

ABSTRACT OF THE DISCLOSURE

Textile sheets are heat sealed using polyurethane heat sealing adhesives obtained from aliphatic isocyanates and glycols having aliphatically bound hydroxyl groups and a molecular weight of up to 400 and 0.1 to 50 percent by weight, based upon the weight of the polyurethane, of a polyhydroxyl compound having at least 2 aliphatic hydroxyl groups and a molecular weight of up to 2500.

---

The invention relates to the use of certain polyurethanes for heat sealing textile sheets and more particularly to the production of heat sealed textile articles utilizing polyurethane heat sealing adhesives.

The bonding of textiles by heat sealing has been heretofore known. The adhesives used for heat sealing are thermoplasts. If these are in the form of thick pastes or solutions they can be applied to the textiles, for example, by means of wiper applicators, or if they are in the form of pourable powders they can be sprinkled onto the textiles. The spraying of dispersions or solutions of the heat sealing adhesives or the application in the form of fleeces or threads are also known. The pieces of textile are then bonded together by hot ironing. The bonds should be resistant to dry cleaning and to washing.

Polyethylene is an example of a thermoplast which can be used for heat sealing textiles because it softens or melts at temperatures of about 90° to 130° C. and then combines with the textiles when cold. Bonding carried out using polyethylene, however, has the disadvantage that the bonds cannot sufficiently withstand cleaning with solvents such as trichloroethylene or cleaning petrol as the polyethylene swells or dissolves in these solvents. Such cleaning processes detach the polyethylene from its support, particularly when temperatures of about 50° to 60° C. are reached or are exceeded. Furthermore, the resistance to boiling with the usual detergents is not sufficient when polyethylene is used as the heat sealing material.

Soft polyvinyl chloride in powder form has also been previously used. These products, however, have the disadvantage that the plasticizers used for plasticizing the polyvinyl chloride are volatile at the temperatures which are used for sintering or ironing. Hence the bonded textiles are hardened. This hardening may also occur gradually at room temperature. The smell of the volatile plasticizer therefore often clings to textiles which have been bonded with plasticized polyvinyl chloride. Another disadvantage in the use of pulverulent soft polyvinyl chloride is that during the heat sealing slight fluctuations in the temperature can cause the textile to be rapidly permeated by the molten powder. This causes the textile which is to be bonded to harden and the bonded area does not then have the required bond strength.

The use of polyurethanes as heat sealing adhesives for the production of textile bonds is also known. The polyurethane used is one which has been prepared from butane-1,4-diol and hexamethylene-1,6-diisocyanate to which plasticizers, for example, soft polyamides, have been added to lower the softening point and the required ironing temperature. The required working-up temperature is, however, rather high, being in the region of about 200° C. Furthermore, the polyamide which has been added as plasticizer lowers the strength of the bonds, especially if it is caused to swell or is partialy dissolved or extracted by solvents such as alcohol. The strength of the bond is thus reduced and the handle of the bonded textiles is impaired by hardening.

Soft linear polyurethanes which contain, as a plasticizing component, polyisocyanates, polyamines or polyglycols with alkyl groups such as β-methyltetramethylene diamine, methyl-1,6-hexanediol, trimethyl-1,6-hexanediol, methyldiethanolamine, neopentyl glycol or trimethyl-1,6-hexane diisocyanate in the side chain have also been used. Heat sealing compositions prepared from such polyurethanes have low softening points and ironing temperatures so that it is not necessary to add any plasticizers as such. However, these heat sealing compositions have undesirable flow properties when molten or partially sintered and also have a low melt viscosity. These heat sealing compositions melt sharply within a narrow temperature range and because of their low viscosity they rapidly flow into the underlying textile support. This causes hardening of the textile, and the bond strengths obtained are only moderate and often insufficient. These unfavorable flow properties make these products difficult to use in practice since even slight deviations from the sintering and ironing temperatures cause the bond strength of the sealed textile sheeting to deteriorate.

It is therefore, an object of this invention to provide heat sealed textile sheet compositions and a process for preparing the same that are devoid of the hereinabove set forth disadvantages and problems. Another object of this invention is to provide heat sealed textile sheets having improved bond strength and improved physical properties. Another object of this invention is to provide bonded textile sheet compositions that are resistant to dry cleaning and washing. A further object of this invention is to provide polyurethane heat sealing adhesive compositions. A still further object of this invention is to provide polyurethane heat sealing adhesive compositions which do not require volatile plasticizers. Another further object of this invention is to provide a process for the preparation of heat sealed textile sheet compositions wherein the handle of the bonded textiles is not impaired. A still further additional object of this invention is to provide a polyurethane heat sealing composition having desirable flow properties that permits uniform distribution of the adhesive binder on textile supports. It is yet another object of this invention to provide a process for producing heat sealed textile sheet compositions without damaging the fibers of the textiles. A still further additional object of this invention is to provide heat sealed textile sheet compositions having a soft textile handle.

The foregoing objects and other which will become apparent from the following description are accomplished in accordance with this invention, generally speaking, by employing polyurethane heat sealing adhesive compositions which have been obtained from aliphatic polyisocyanates and glycols which have aliphatically bound OH groups and a molecular weight of up to 400 with the addition of 0.1% to 50% by weight, based on the total polyurethane composition, of polyhydroxyl compounds which contain at least two aliphatic hydroxyl groups and have a molecular weight of up to 2500 as heat sealing adhesives of the production of textile bonds which are resistant to washing and cleaning. More particularly, this invention relates to the use for heat sealing textile sheet material, of polyurethanes which have been obtained from aliphatic polyisocyanates and glycols which have aliphatically bound hydroxyl groups and a molecular weight of up to 400 with the addition of 0.1% to 50% by weight, base on the polyurethane composition, of polyhydroxyl compounds which contain at least two aliphatic hydroxyl groups and have a molecular weight of up to 2500. The polyurethane heat sealing compositions of this invention are particularly usable as textile heat sealing compositions owing to their properties and the ease with which they can be worked up and used.

The polyurethanes which are particularly preferred for use according to the invention have melting or softening ranges of between about 80° and 200° C., preferably between about 100° and 150° C. so that they can be used for sealing textiles without damaging the fibers.

Suitable starting materials for the preparation of the polyurethanes which are used according to this invention are any suitable glycols which have aliphatically bound hydroxyl groups and which have a molecular weight of up to 400. As examples of such suitable glycols there may be mentioned for example, glycols such as ethylene glycol, 1,3-propylene glycol, butane-1,2-diol, butane-1,3-diol, butane-1,4-diol, pentane-1,5-diol, hexane-1,2-diol, hexane-1,4-diol, hexane-1,6-diol, methylhexane-1,6-diol, 2-butene-1,4-diol, trimethylhexanediol, 1,10-decanediol, neopentyl glycol, 1,2 - cyclohexanediol, 1,4-bis-hydroxymethylene-cyclohexane, diethylene glycol, thiodiglycol, 2,2′-[thiobis(ethyl)]diethanol, methyldiethanolamine, 3-allyloxy-1,5-pentanediol, xylylene glycol, hydroxyethylation products of divalent phenols and glycols such as bis-hydroxyethyl-hydroquinone or hydroxyethyl-hexane-1,6-diol and the like or mixtures thereof. It is particularly preferred to use mixtures of various glycols.

Also, the inclusion of polyols which contain three or more hydroxyl groups is often desirable in order to obtain improved technological properties. Any suitable polyols which have at least three aliphatic hydroxyl groups and a molecular weight of up to 400 may be employed in the process of this invention, such as, for example, 1,2,6-hexanetriol, glycerol, pentaerythritol, 2-hydroxy ethyl-1,2,5-hexanetriol, 3-(2-hydroxyethoxy)-1,2-propanediol, 1,1,4,4 - tetramethylolcyclohexane, 1,1,1-trimethylolethane, 1,1,1 - trimethylolpropane, 3 - (2-hydroxy propoxy)-1,2-propanediol, 1,1,1 - tris[(2 - hydroxyethoxy)-methyl] ethane, triethanolamine, triisopropanol-amine, N,N,N′,N′-tetrakis(2-hydroxyethyl)-ethylenediamine and the like. Especially preferred is trimethylolpropane.

Any suitable aliphatic polyisocyanates may be employed according to this invention, such as, for example, ethylene diisocyanate, propylene diisocyanate, butane-1,4-diisocyanate, pentylene diisocyanate, hexane - 1,6-diisocyanate, thiodiethylene diisocyanate, trimethylhexane diisocyanate, octamethylene diisocyanate, decamethylene diisocyanate, xylylene diisocyanate, cyclohexylene-1,3-diisocyanate, 1-methylcyclohexane - 2,4-diisocyanate, 1-methylcyclohexane - 2,6-diisocyanate, 1 - ethylcyclohexane - 2,4-diisocyanate, cyclohexane-1,4 - diisocyanate, 1,3,5-trimethylcyclohexane - 2,4-diisocyanate, dicyclohexylmethane-4,4′-diisocyanate, dicyclohexyldimethylmethane - 4,4′ - diisocyanate, 3,3′,5,5′ - tetramethyldicyclohexylmethane - 4,4′-diisocyanate, isophorone diisocyanate and the like. Diisocyanate carboxylic acid esters such as those described, for example, in British patent specifications Nos. 1,072,956 and 965,474, isophorone diisocyanate, biuret triisocyanates which may be prepared from aliphatic diisocyanates by reacting them with water to form urea and biuret groups, such as, for example, biuret-trihexane triisocyanate:

OCN—(CH₂)₆—NH—CO—N—(CH₂)₆—NCO
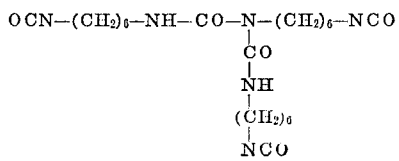

which is prepared from hexane-1,6-diisocyanate, and adducts of aliphatic diisocyanates with polyols which have at least three hydroxyl groups, and reaction products which have been obtained by the addition of acrylonitrile to polyols, hydrogenation and phosgenation. Hexane-1,6-diisocyanate and biuret triisocyanates are particularly preferred.

Higher molecular weight polyhydroxyl compounds which contain at least two aliphatic hydroxyl groups and have a molecular weight of up to 2500, preferably between 250 and 1000 are known per se and may be prepared for example by polycondensation and polymerization. Polyesters, polyacetals, polyethers, polyamides, polyesteramides, polycarbonates and polylactones, for example, are suitable.

The polyesters, polyesteramides and polyamides may also include polycondensates prepared from polybasic saturated and unsaturated carboxylic acids and polyhydric saturated and unsaturated alcohols, aminoalcohols, diamines, polyamines and their mixtures.

The polyacetals used may be, for example, compounds which can be prepared from hexane-1,6-diol and formaldehyde.

The polyethers may be, for example, polymerization products of ethylene oxide, propylene oxide, tetrahydrofuran, butylene oxide and their copolymerization or graft copolymerization products as well as the polyethers obtained by condensation of polyvalent alcohols, amines, polyamines and aminoalcohols.

The polylactones may be polyesters prepared by the polymerization of lactones, ε-caprolactone, being especially preferred.

Suitable polycarbonates, for example, are the polyesters prepared from glycols and polyols such as hexanediol or trimethylol propane with diphenyl carbonate by ester interchange.

The higher molecular weight polyhydroxy compounds used are preferably linear or slightly branched polyesters. Polyurethanes which have been prepared from phthalic acid polyesters are particularly suitable for use as heat sealing adhesives. Mixtures of different polyhydroxyl compounds may also be used in order to vary the flow properties of the products during sintering and ironing.

Irrespective of the choice of starting materials, the components are generally reacted together in such proportion that the NCO/OH ratio is from about 0.8 to about 1.2, preferably about 1.0.

The polyhydroxyl compounds which contain at least two aliphatic hydroxyl groups and have a molecular weight of up to 2500, preferably 250 to 1000, are used in an amount of from about 0.1 to about 50% by weight, based on the polyurethane mass, preferably from about 10 to about 40%. The optimum quantities of higher molecular weight polyhydroxyl compounds which should be included in order to obtain advantageous melt viscosities and the required sintering and ironing temperatures are best determined by serial tests.

Preparation of the polyurethanes which are to be used as heat sealing adhesives is generally carried out in solution using solvents which will not react with the polyisocyanates and the polyhydroxyl components such as, for example, in acetone, tetrahydrofuran, dioxane, methylethyl ketone, benzene, toluene, xylene, methyl acetate, butyl acetate, chloroform, carbon tetrachloride, chlorobenzene or the like. The polyurethanes can be prepared, for example, by dissolving the components in the solvent. The reaction is generally carried out between about 40° C. and 160° C., preferably between about 60° C. and 130° C. The optimum temperatures are best determined by a series of tests. The polyurethane starts to separate out after some time and the precipitated reaction product is removed, such as, for example, by suction filtration and is then dried.

Alternatively, the higher molecular weight polyhydroxyl compound which has a molecular weight of up to 2500 may first be reacted with the aliphatic polyisocyanates, the reaction with polyols which have a molecular weight of up to 400 being then completed in the presence or absence of a solvent. The reaction may also be carried out stepwise in any desired sequence.

The components may also be reacted in a solvent in which the reaction product is also soluble. Such solvents are, for example, formamide, dimethylformamide, dimethylacetamide, dimethylsulphoxide and the like. The dissolved reaction product is isolated such as, for example, either by distilling off the solvent or by precipitation with water or with solvents in which the reaction product is insoluble or only sparingly soluble. These solvents should be miscible or at least partly miscible with the solvents in which the polyurethane is dissolved. The recovered polyurethane is then freed from residual solvent by drying, if desired, in a vacuum and, if desired, at an elevated temperature. As examples of suitable precipitating agents there may be mentioned, for example, tetrahydrofuran and acetone. Very finely divided powders are obtained by this method.

The polyurethane may also be isolated from the solutions by spray drying, the solution being atomized from nozzles in a drying chamber at elevated temperature under pressure. Very small average particle sizes are also obtained by this process.

A polyurethane may also be prepared without solvent in a melt by heating to about 40° to 200° C., preferably from about 60° to 130° C.

If the heat sealing adhesive is used as a pourable powder, the crude product is either granulated or reduced to the desired particle size by breaking up into small pieces and grinding, if desired, in the presence of Dry Ice and fractional sieving.

The average particle size of the polyurethane powders generally varies between about 0.001 mm. and 0.5 mm. Particle sizes of between about 0.001 mm. and 0.1 mm. or about 0.3 mm. to 0.5 mm., for example, may be used, depending on the intended application and the form in which the heat sealing masses are applied. Polyurethane powders which have average particle sizes of about 0.001 mm. to 0.1 mm. are preferred.

Controlled uniform and economical distribution of the polyurethanes can be simply achieved without the use of special apparatus by applying the polyurethanes in the form of threads, fabrics, fleeces or as pastes. The losses of the sealing material which tend to occur when using pulverulent material which is powdered or scattered over the surface are thus avoided.

The bond strengths and the properties of the bonded materials which are obtained according to this invention allow the heat sealing compositions to be used extensively for woven fabrics, knitted fabrics, felts and fleeces of natural and synthetic fibers. There may be mentioned, for example, textiles particularly of fibers of animal hides and leather, silk, mohair, cotton, sisal, hemp, jute, ramie, flax, wool, synthetic cellulose, for example, viscous, cellulose acetate, cellulose acetate butyrate, saponified cellulose acetate, cupra-ammonium rayon, ethyl cellulose, polyvinyl alcohol-protein fibers, algin, pectin, polyethylene terephthalate, polyacrylonitrile, polyethylene, polypropylene, polyvinyl chloride, polyamides, polyurethanes, regenerated proteins such as those from casein, soybeans, peanut protein, zein, gluten, egg albumin and mixtures or blends of the above.

The bonded textile materials are resistant to washing and cleaning and are lightfast.

The heat sealing is carried out by applying the polyurethane in any suitable form, such as, for example, as a powder or as threads, fleeces, woven fabric or as a paste, to the textile surface and sintering, using a source of heat at about 80° C. to 200° C., preferably 120° C. to 180° C. Another piece of woven fabric is then ironed onto this prepared surface at a temperature of about 120° C. to 180° C., preferably at about 130° C. to 150° C.

Powders can be evenly distributed over the surface of the support, such as, for example, a woven fabric or a fleece, by shaking the powder from a sieve in an amount of from about 6 g./m.$^2$ to 30 g./m.$^2$, for example. The supports to which the powder has been applied are then exposed for about 10 to 20 seconds to sources of infrared radiation which are placed at a distance of, for example, about 10 cm. or more from the surface of the support and which have a rating, for example, of about 1500 watts and a radiant surface area, for example, of about 300 cm.$^2$. The surface temperature of the support material then reaches about 130° C. or more. The powder starts to sinter and combines permanently with the surface of the support. The material is removed from the heating zone and is then later combined with another textile sheet, such as, for example, with a cotton poplin or with a knitted polyacrylonitrile fabric or with a fleece or the like to form a bonded material. For this purpose, the support material and the second material are superimposed one on top of the other so that the heat sealing adhesive forms the middle layer between the two materials. The materials are bonded together in an ironing press at a temperature of about 160° C. using a pressure of from about 0.5 to about 0.7 kg./cm.$^2$ for about 15 seconds. The adhesive becomes plastic during the time and permanently bonds the support and the material placed on it together. The bonded material is then removed from the apparatus, for example, from the ironing press, and it is ready for use as soon as it has cooled.

Heat sealing with the polyurethane pastes is generally carried out by stirring a granulate which has a particle size of about 0.001 mm. to 0.1 mm. together with water in equal proportions by weight and stirring the paste together with a thickener, for example, a thickener based on polymethacrylate with the addition of ammonia. This mixture is then pressed uniformly onto the support, preferably point by point, using a stencil, sive drum or the like and applying from about 10 to about 50 g./m.$^2$, preferably about 25 g./m.$^2$ of pressure. After this mixture has been applied to the support, for example, a woven fabric or a fleece, the material is then dried in a drying tunnel. The polyurethane particles become so firmly bonded to the support by the binder dispersion that the textile webs can be easily rolled up. The combining of this material with another textile such as with a woven or knitted fabric or fleece to produce a bonded material can then be carried out by applying this second textile to the surface of the support material on which the synthetic resin has been imprinted and bonding the two together by heat under pressure, such as, for example, in an ironing press. The composite material is then immediately removed from the press and after cooling can be used at once. The laminates produced in this way have a desirably soft textile handle owing to the uniform distribution of the binder.

Fibers or fiber structures are another form in which the polyurethanes provided by the invention may be applied. Fibers can be drawn from the melt in a known manner, for example, at temperatures of about 100° C. to 200° C. with exclusion of air, and cut up into staple fibers. These can then be used to form fleeces or spinning threads and these may be further worked up into woven or knitted fabrics and sheets. For hot sealing textiles these sheet materials are applied to the support material and are then either partly sintered prior to a subsequent ironing or are directly bonded to a second material, for example, a woven or knitted fabric or fleece made of materials which are not thermoplastic at the processing temperatures used. This bonding is carried out by ironing under heat and pressure. Ironing presses or rollers are suitable for this purpose. The process of the invention also produces soft bonded materials which have a good resistance to the action of water and solvents.

The invention is further illustrated but is not intended to be limited by the following examples in which all parts and percentages are by weight unless otherwise specified.

The following are set forth as examples of preparations of polyurethane powders which can be used according to the process of the invention.

PREPARATION A

A polyurethane powder is prepared from about 53.3 percent of hexane-1,6-diisocyanate, about 18.9 percent of hexane-1,6-diol, about 11.1% of neopentyl glycol 0.9 percent of trimethylolpropane, and about 15.8 percent of a polyester of phthalic acid anhydride and ethylene glycol (OH number 280, molecular weight about 400).

The polyurethane is prepared by reaction for several hours in toluene at about 80° C. The product precipitates towards the end of the reaction.

The powder is dried, broken into small pieces and ground. The polyurethane powder obtained is reduced to the required particle size by fractional sieving. Melting range: 128 to 130° C.

PREPARATION B

A polyurethane powder is prepared from about 51.7 percent of hexane-1,6-diisocyanate, about 17.6 percent of hexane-1,6-diol, about 10.3 percent of neopentyl glycol, about 0.8 percent of trimethylolpropane and about 19.6 percent of the polyester used in Preparation A.

After several hours reaction in dimethyl formamide at about 100° C., the product is precipitated by stirring the solution into acetone. The precipitated product is removed by suction filtration and dried. After grinding and fractional sieving, a polyurethane powder which has a melting range of 122° C. to 124° C. is obtained.

PREPARATION C

A polyurethane powder is prepared from about 39.3 percent of hexane-1,6-diisocyanate, about 13.2 percent of hexane-1,6-diol, about 7.8 percent of neopentyl glycol and about 39.7 percent by weight of a polyester of adipic acid and hexane-1,6-diol (OH number 133, molecular weight, about 840).

The polyester of adipic acid and hexane-1,6-diol which has been dehydrated for about 30 minutes under vacuum at about 120° C. is first reacted with hexane-1,6-diisocyanate for about two hours at about 120° C. The prepolymer prepared in this way is then dissolved in toluene and the remaining components are added at about 80° C. The reaction product starts to separate after some time. After removal of the solvent, the reaction product is dried, ground and sieved. Melting range: 120 to 126° C.

EXAMPLE 1

The polyurethane powder (42 g.) prepared according to A which has a particle size of 0.01 to 0.08μ is stirred into a paste which contains the following constituents:

| | Parts |
|---|---|
| Water | 56 |
| Thickener based on polymethacrylate | 8 |
| Glycerol | 3 |
| Silicone defoaming agent | 0.5 |
| 25% ammonia | 1.2 | and the paste is homogenized by stirring. It is then applied in points to a cotton fabric in a quantity of about 35 g./m.² of solid substance using a screen printing machine and dried by a brief passage through a drying machine. The individual points which have an average diameter of about 1 mm. are already sufficiently firmly bonded to enable the fabric to be rolled up.

The fabric on which the paste has been printed is later placed together with a second cotton fabric so that th polyurethane is situated between the two and they are then pressed in an ironing press for about 10 seconds at about 160° C. at a pressure of about 650 g./cm.². The bonded material obtained is found to have the following separation resistance after cooling:

| | Kg. wt./5 cm. |
|---|---|
| Without treatment | 2.4–2.9 |
| After machine washing (60° C.) | 2.3–2.9 |
| After cleaning in perchloroethylene | 1.8–2.2 |

The values given represent the resistance to separation of test samples 5 cm. in width in the dry state.

EXAMPLE 2

The polyurethane powder prepared according to B which has a particle size of about 0.01 to 0.08μ is applied as a series of points to a horsehair inlay fabric in an amount of about 15 g./m.² using a powder point apparatus (Saladin, Sirnach, Switzerland), the powder being melted on to the fabric and, after passing through a cooling zone, the material is rolled up. It is then pressed together with a second fabric (woolen top fabric) under an ironing press as described in Example 1 and cooled. The resulting bonded material is found to have the following separation resistances:

| | Kg. wt./5 cm. |
|---|---|
| Without treatment | 2.8–3.0 |
| After machine washing (60° C.) | 2.6–2.8 |
| After boiling wash | 2.4–2.7 |
| After dry-cleaning in perchloroethylene | 2.0–2.4 |

EXAMPLE 3

The polyurethane powder prepared according to C which has a particle size of about 0.3 to about 0.5 mm., is applied with a sieve to an undyed cross-twill cotton fabric which has a weight of about 200 g./m.², the amount of powder applied being about 28 g./m.². The cotton fabric which has been covered with the powder is then exposed for about 20 seconds to a 1500 watt infrared radiator which has a surface of about 300 cm.² at a distance of about 10 cm. The heat sealing powder is then softened on the surface and after cooling it adheres to the fabric. A cotton tricot fabric is placed on the sintered woven fabric and ironed in an ironing press at about 160° C. at a pressure of about 650 g./cm.² for about 120 seconds. The bonded material obtained is found to have the following separation resistance after cooling:

| | Kg. wt./5 cm. |
|---|---|
| Without treatment | 2.9–3.5 |
| After machine washing (60° C.) | 2.9–3.4 |
| After boiling wash | 2.8–3.3 |
| After dry-cleaning in perchloroethylene | 2.8–3.4 |

COMPARISON EXAMPLE

For comparison, a polyurethane powder prepared from about 56.6 percent of hexane - 1,6 - diisocyanate, about 7.9 percent of hexane - 1,6 - diol and about 35.5 percent of an isomeric mixture of methylhexane - 1,6 - diol (prepared from a commercial mixture of isomeric methylcyclohexanol) which has a melting point of 118 to 120° C. is used as indicated in Example 3.

The bonded materials obtained have very poor wearing properties since owing to its very narrow melting range and low melt viscosity during processing (sintering and ironing), the polyurethane powder used melts within a very short time and rapidly flows into the fabric so that most of it is lost for the bonding process.

The resistances to tearing were found to be as follows:

| | Kg. wt./5 cm. |
|---|---|
| With treatment | 1.8–2.0 |
| After machine washing (60° C.) | 1.1–1.3 |
| After boiling wash | 0.7–1.0 |
| After dry-cleaning with perchloroethylene | 1.6–1.8 |

It is to be understood that any of the components and conditions mentioned as suitable herein can be substituted for its counterpart in the foregoing examples and that

What is claimed is:

1. A heat sealed textile sheet composition comprising a first textile support sheet and a second textile top sheet bonded to said support sheet by a heat sealing adhesive middle layer wherein said heat sealing adhesive middle layer is a polyurethane composition obtained from hexane - 1,6 - diisocyanate and a glycol component which is a mixture of hexane - 1,6 - diol and neopentyl glycol and 0.1 to 50 percent by weight based on the weight of the polyurethane of a polyester containing at least two hydroxyl groups and having a molecular weight of up to 2500.

References Cited

UNITED STATES PATENTS

| 3,428,609 | 2/1969 | Chilvers et al. | 260—75 |
| 3,420,725 | 1/1969 | Curry | 156—305 |
| 3,496,045 | 2/1970 | Keberle et al. | 156—301 |
| 3,538,055 | 11/1970 | Camilleri et al. | 260—75 |

ROBERT F. BURNETT, Primary Examiner

R. A. DAWSON, Assistant Examiner

U.S. Cl. X.R.

156—283, 291, 309, 331; 161—89, 148, 150, 156, 158, 190; 260—75 NP